(12) United States Patent  
Gardner

(10) Patent No.: US 6,685,887 B1
(45) Date of Patent: Feb. 3, 2004

(54) SYSTEM FOR AMBIENT AIR POLLUTION PROCESSING BY MOTOR VEHICLES

(76) Inventor: Conrad Oliver Gardner, 2600 2nd Ave. Suite 2103, Seattle, WA (US) 98121

( * ) Notice: Subject to any disclaimer, the term of this patent is extended or adjusted under 35 U.S.C. 154(b) by 1032 days.

(21) Appl. No.: 08/536,350

(22) Filed: Sep. 29, 1995

Related U.S. Application Data

(63) Continuation-in-part of application No. 08/443,204, filed on May 18, 1995, now abandoned, which is a continuation-in-part of application No. 08/273,114, filed on Jul. 11, 1994, now abandoned, which is a continuation-in-part of application No. 08/140,507, filed on Oct. 25, 1993, now Pat. No. 5,346,031, which is a continuation of application No. 07/867,412, filed on Apr. 13, 1992, now Pat. No. 5,301,764.

(51) Int. Cl.[7] .............................. F01N 3/00; F01N 3/10; F01N 3/24; F01N 3/30
(52) U.S. Cl. ........................ 422/173; 422/168; 422/169; 422/170; 422/171; 422/174; 422/177; 422/180; 55/285.3; 423/212; 423/213.2
(58) Field of Search ........................ 422/171, 177, 422/168, 169, 170, 173, 174, 180; 55/269, 385.3, DIG. 30; 423/212, 213.2, 213.7, 246, 247, 210

(56) References Cited

U.S. PATENT DOCUMENTS

| 444,725 | A | * | 1/1891 | Feaster | ........................ 16/97 |
| 3,738,088 | A | * | 6/1973 | Colosimo | .................. 55/385.3 |
| 3,979,185 | A | * | 9/1976 | Stevenson | .................. 422/171 |
| 4,256,700 | A | * | 3/1981 | Smith et al. | ................. 422/171 |
| 4,278,639 | A | * | 7/1981 | Tadokoro et al. | ........... 422/171 |
| 4,501,118 | A | * | 2/1985 | Thayer et al. | ............... 422/171 |
| 4,511,536 | A | * | 4/1985 | Shimozi et al. | .............. 422/171 |
| 5,042,249 | A | * | 8/1991 | Erdmannsdoerfer | ........ 422/171 |
| 5,155,994 | A | * | 10/1992 | Muraki et al. | .............. 422/171 |
| 5,155,995 | A | * | 10/1992 | Kinnear et al. | ................ 60/300 |
| 5,250,268 | A | * | 10/1993 | Geiger | ........................ 422/171 |
| 5,285,640 | A | * | 2/1994 | Olivo | .......................... 422/171 |
| 5,509,853 | A | * | 4/1996 | Wells | ........................ 55/385.3 |

* cited by examiner

*Primary Examiner*—Jerry D. Johnson
*Assistant Examiner*—Alexa A. Doroshenk
(74) *Attorney, Agent, or Firm*—Conrad O. Gardner

(57) ABSTRACT

An open loop system for ambient air pollution processing by motor vehicles utilizing controlled volumes of air flow over exhaust system surface.

13 Claims, 2 Drawing Sheets

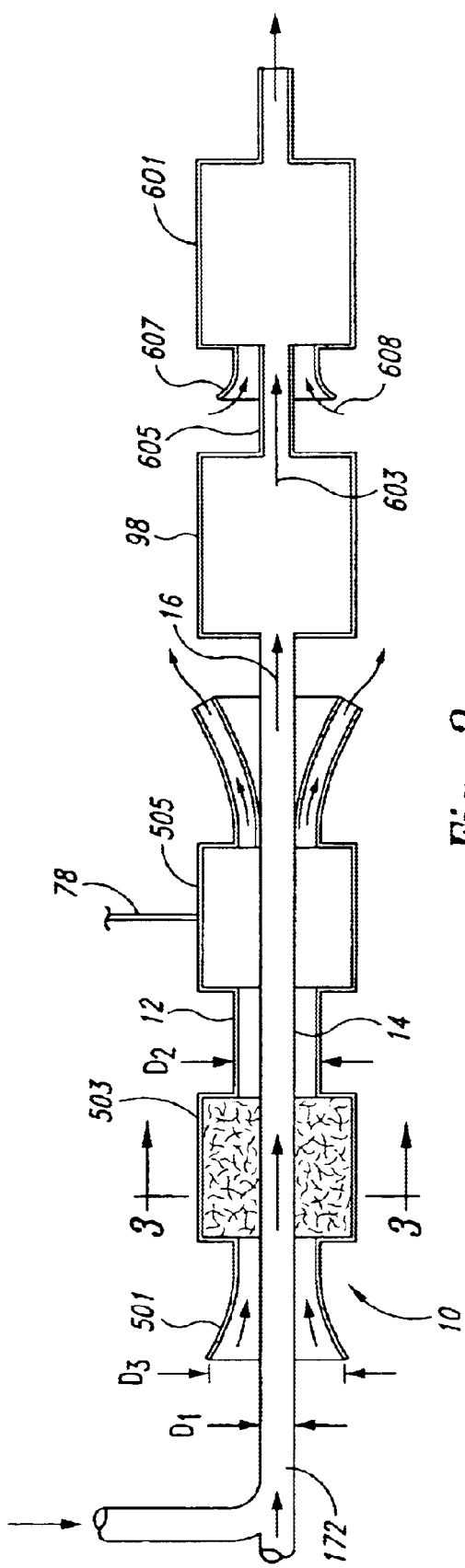
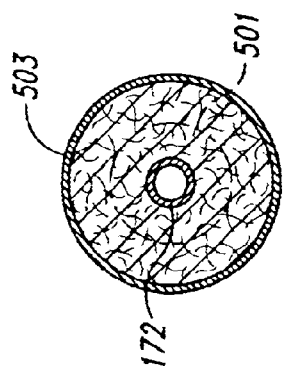
Fig. 2
Fig. 3

SYSTEM FOR AMBIENT AIR POLLUTION PROCESSING BY MOTOR VEHICLES

RELATED APPLICATIONS

This application is a continuation in part of application Ser. No. 08/443,204 filed May 18, 1995 now abandoned which is a continuation in part of application Ser. No. 08/273,114 filed on Jul. 7, 1994 now abandoned which is a continuation in part of application Ser. No. 08/140,507 filed Oct. 25, 1993, now U. S. Pat. No. 5,346,031 issued Sep. 13, 1994 which is a continuation of application Ser. No. 07/867,412 filed on Apr. 13, 1992, now U.S. Pat. No. 5,301,764 issued Apr. 12, 1994.

BACKGROUND OF THE INVENTION

1. Field of the invention.

The present invention relates generally to ambient air pollution processing and more specifically to purifying exhaust emissions along highway by motor vehicles utilizing such highways.

2. Description of the Prior Art

Catalytic converters have been utilized in closed loop systems where the catalytic converter is disposed in the exhaust path to process pollutants generated by the motor vehicle internal combustion engine. The temperatures of the exhaust gases has generally been high enough (e.g. in the range of 400 to 600 degrees C. to at high power operation e.g. 900 degrees C.) to provide for satisfactory operation of the present 3 way catalytic converters in some instances supplemented during engine warm up (when exhaust temperatures are too low) by electrical heating of the catalysts.

Location of catalytic conversion material such closed loop systems in a high temperature region is shown in my U.S. Pat. No. 3,788,284 where the catalyst is distributed in the exhaust system, more particularly over a portion of the inner wall of the exhaust manifold.

It is accordingly an object of the present invention to provide open loop processing of outside ambient air.

It is a further object of the invention to provide ambient air processing utilizing waste heat from a motor vehicle.

It is yet another object of the present invention to utilize duct controlled air flow over a high temperature exhaust system of a motor vehicle to heat ambient air so that lift off temperatures of catalysts can be achieved.

SUMMARY OF THE INVENTION

A primary objective of the system is the utilization of heat from an internal combustion engine to heat catalysts for ambient air processing without compromising engine performance.

It is recognized that the temperature of exhaust gas in a spark-ignition engine can vary from to 400 degrees C. during idle to about 900 degrees C. at high power operation. The most common range is 400 to 600 degrees C. Catalytic oxidation of CO and hydrocarbons in the exhaust is achievable at temperatures as low as 250 degrees C.

Requirements for adequate processing of ambient air surrounding a motor vehicle are dependent upon 3 parameters:

1. The active material must be distributed over a large surface area so that the mass-transfer characteristics between the gas phase and the active catalyst surface are sufficient to allow close to 100 percent conversion with high catalytic activity.

2. Exposure to temperatures of the order of 400 to 600 degrees C. to permit utilization of a wide range of known catalysts.

3. Controlled volume of ambient air flow over a predetermined catalyst surface area.

Cost and Economic Considerations:

1. Zero cost of operation utilizing waste heat.

2. Minimal cost in system deployment.

The present system and method utilizes exhaust system surface heating of catalysts in a duct to process controlled amounts of ambient air through the duct. Emitted exhaust gases may also be utilized to heat a catalytic converter for ambient air processing.

BRIEF DESCRIPTION OF THE DRAWINGS

FIG. 2 is a sectional elevational view of the system of FIG. 1 showing ambient air flow through catalytic material disposed along a duct having an inner wall surface comprising the high temperature exhaust system; and, FIG. 3 is a section A—A taken through catalytic converter 503 shown in FIG. 2.

DESCRIPTION OF THE PREFERRED EMBODIMENT

Figure 1:
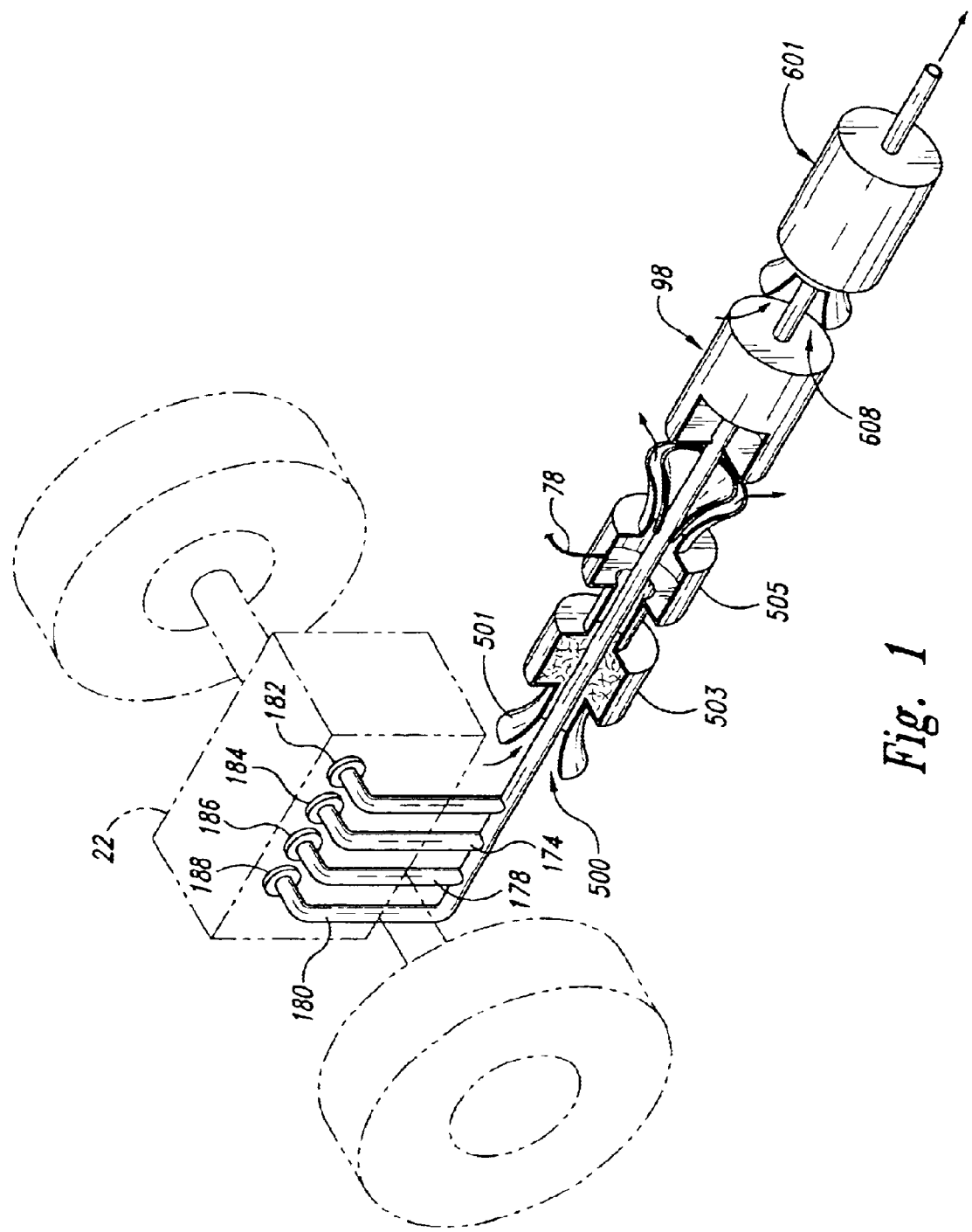
FIG. 1 is a diagram of the present ambient air pollution processing system for a motor vehicle showing intake positioned toward the forward direction of travel of the vehicle.

Turning now to the ambient pollutant processing system of FIG. 7. it can be seen that a standard internal combustion engine 22 has an exhaust manifold 172 connected to cylinder exhaust lines 174, 176, 178, and 180 leading from exhaust ports 182, 184, 186 and 188 respectively. At the downstream end of exhaust manifold 172 there is a conventional 3 way catalytic converter 98. As noted in my U.S. Pat. No. 3,889,464 at low exhaust temperatures, 3 way catalytic converters are ineffective since not having reached light off temperatures and one solution is to heat the cool exhaust up to temperatures required to activate the 3 way catalysts. Another solution is to electrically heat the catalyst directly as shown in U.S. Pat. No. 5,170,624. A further solution is to utilize a catalytic converter having a catalyst with a lower light off temperature for processing an individual pollutant, e.g. carbon monoxide requiring a temperature of only 390 degrees F. instead of the much higher temperatures required for processing of the other pollutants processed by 3 way catalytic converters. The literature has even suggested painting catalysts that work at summer temperatures on merely a warm surface such as air conditioner compressors and automobile radiators. The present system is an open system in contrast to present closed systems with 3 way catalytic converters in that ambient pollutants 500 are funneled through an inlet comprising a flared open scoop 501 located beneath the vehicle and along the outer surface of high temperature exhaust manifold 172 which operates in the 1,800 degree F. range. In the present system the catalyst in passive catalytic converter 503 surrounds the outer wall of exhaust manifold 172 instead of the inner wall 3 as shown at line 20, column 5 of my U.S. Pat. No. 3,788,284. Catalysts selected for use in passive catalytic converter 503 depend upon exhaust manifold 172 outer wall surface temperatures. Electrically heated catalytic converter 505 may comprise an electrically heated catalytic converter 192 of the type shown in U.S. Pat. No. 5,170,624 the details of which are incorporated herein by reference. The electrically heated internal structure surrounds the outer wall surface of exhaust manifold 172 thus further deriving heat therefrom (and requiring less electrical power) when the exhaust flowing through exhaust manifold 172 has reached normal elevated temperatures. Power for electrically heated catalytic converter 505 may be utilized from any electrical power source when surplus power is available e.g. from electric power 78 as shown in FIG. 3 of my U.S. patent application No. 08/443, 204 when operating in the electric power mode and surplus power is available, that is when not needed to full charge energy storage 158.

Turning now to FIG. 2 it can be seen that the present open loop ambient air processing system is disposed along the exhaust system preferably as far upstream in the region of exhaust manifold 172 as structure of various automotive exhaust manifolds in commercial use permits. The system comprises a duct 10 having an outer wall surface 12 and an inner wall surface 14 (inner wall surface 14 being the outer wall surface of the exhaust system manifold 172. The inner wall surface 14 portion exposed to catalytic material in passive converter 503 or electrically heated converter 505 can be made more heat transmissive than tailpipe region 16 in order to more effectively provide heating of the catalysts.

Where flared scoop diameter D3 and duct diameter D2 approach D1, less ambient air flow volumes are processed leading to effective catalytic processing by catalysts of converter 503, and/or 505 at a closely adjacent inner wall surface 14 of high temperature exhaust system duct 10. The forward facing intake position of duct 10 comprising flared scoop 501 located beneath the vehicle receives ambient air during forward motion of the vehicle although this intake may be disposed near the forward portion of the vehicle, e.g. at the radiator grille or at the location for intake air for the vehicle passengers as long as forward motion of the vehicle causes ambient air to flow therethrough. Waste heat is utilized without affecting engine performance however when an electrically heated catalytic converter 505 is utilized it is then possible to supplement exhaust system heating of catalysts utilizing wasted electrical power when conditions of motor vehicle operation do not demand the electric power being generated e.g. by the alternator. Such conditions include e.g. daytime driving when headlights are not required and the charging system is not charging the batteries. The alternator in such instances provides heating of electrically heated catalytic converter 505 to process ambient air in the present open loop system.

A further advantage of the present ambient air processing system for motor vehicles is that the intake of ambient air is located to receive air containing pollutants at their highest concentrations yielding more efficient air purification when contrasted to suggested ambient air pollution processing systems which might be located on top of buildings and other locations remote from the highway sources.

Rather than depending upon heating of catalytic material from the outer wall surface of the exhaust system manifold 172 as hereinbefore described for passive catalytic converter 503, a passive catalytic converter 601 may directly receive exhaust gases 603 (as shown in FIG. 1) from tailpipe 605 to provide heating of the catalytic material while also receiving outside ambient air 608 through inlet 607 for processing. Simple modification of current motor vehicles is thereby facilitated simply by attachment of converter 601 to the end of tailpipe 605. Exhaust gases 603 are currently of temperatures high enough to provide satisfactory operation of 3 way catalytic converter 98 and regulation of the amount of air flow intake through inlet 607 prevents excessive ambient air flow which would degrade performance and cause temperatures to fall below lift off temperatures for catalytic material in passive catalytic converter 601.

Those skilled in the art upon a reading of this specification will appreciate that passive converters 503 and 98 could be combined in a unitary housing or integrally structured converter to further reduce expense and simplify installation.

The preceding and further advantages will appear to those skilled in the art upon a reading of the foregoing specification.

While the preferred embodiments of the invention have been illustrated and described, variations will be apparent to those skilled in the art. Accordingly, the invention is not to be limited to the specific embodiments illustrated and described, and the true scope of the invention is to be determined by reference to the following claims.

The embodiments of the invention in which an exclusive property or privilege is claimed are defined as follows:

1. In combination in a motor vehicle:
   an internal combustion engine;
   an exhaust manifold coupled to said internal combustion engine;
   a 3 way catalytic converter;
   said exhaust manifold having a downstream end coupled to said 3 way catalytic converter;
   said exhaust manifold having an outer wall surface; and,
   a catalytic converter surrounding said outer wall surface for deriving heat from said outer wall surface and processing ambient air in a path separate from the exhaust processing path.

2. The combination according to claim 1 including means for directing ambient air pollutants along said outer wall surface.

3. The combination according to claim 1 wherein said catalytic converter surrounding said outer wall surface comprises an electrically heated catalytic converter.

4. In combination:
   a motor vehicle:
   an internal combustion engine in said motor vehicle;
   an exhaust flow path downstream from said internal combustion engine;
   a catalytic converter outside said exhaust flow path; and,
   a flared scoop located beneath said motor vehicle for funneling ambient pollutants to said catalytic converter for processing said ambient pollutants in a path outside said exhaust flow path.

5. In combination in a motor vehicle:
   an internal combustion engine having an exhaust flow path;
   a catalytic converter disposed outside said exhaust flow path for deriving heat provided by said internal combustion engine; and,
   an open loop system including said catalytic converter coupled to an inlet for receiving ambient pollutants and processing said ambient pollutants outside said outside exhaust flow path.

6. An ambient air pollution processing system for a motor vehicle having an exhaust manifold comprising:
   an open loop system having an intake for receiving air during forward motion of the vehicle; and
   an electrically heated catalytic converter coupled downstream from said intake for processing the received air outside said exhaust manifold, said electrically heated catalytic converter utilizing surplus electrical power generated by said motor vehicle.

7. An ambient air processing system for a motor vehicle having an exhaust manifold coupled to exhaust system tailpipe for discharging exhaust gases comprising:

a catalytic converter coupled to said exhaust system tailpipe;

said catalytic converter receiving said exhaust gases for heating said catalytic converter; and said catalytic converter further receiving ambient air and processing said ambient air outside the exhaust path for said exhaust manifold.

8. A method for processing ambient air in a motor vehicle having an exhaust manifold comprising the steps of:

utilizing exhaust gases from the tailpipe of a motor vehicle to heat a catalyst; and said catalyst disposed to receive ambient air for processing the ambient air outside of the exhaust path of said exhaust manifold.

9. The method according to claim 8 including the further step of regulating the amount of ambient air received by regulating the flared scoop diameter D3 and duct diameter D2 to approach D1 to prevent degrading the performance of said catalyst and causing temperatures of said catalyst to fall below lift off temperatures of said catalyst.

10. An ambient air pollution processing system for processing ambient air outside the exhaust manifold comprising:

a tailpipe coupled to an exhaust manifold;

a three way catalytic converter coupled between said exhaust manifold and said tailpipe for processing exhaust gases in said tailpipe; and, a further catalytic converter attached to the end of said tailpipe for receiving heat from exhaust gases in said tailpipe to provide heating of the catalytic material while also receiving outside ambient air for processing outside said tailpipe.

11. An ambient air processing system for a motor vehicle comprising:

an exhaust system manifold;

a tailpipe coupled to said exhaust system manifold; and, said exhaust system manifold having an outer wall surface portion more heat transmissive than the tailpipe region thereby providing heating of catalyst material disposed outside said outer wall surface portion of said exhaust system manifold for deriving heat from said outer wall surface portion more heat transmissive than said tailpipe region for treating ambient air outside said exhaust system manifold.

12. A system for processing exhaust gases from an internal combustion engine including a catalytic converter disposed downstream of an exhaust manifold for processing engine exhaust gas, said catalytic converter receiving ambient air for processing the engine exhaust gases, the improvement comprising a further catalytic converter deriving heat from the exhaust gases for processing ambient air in a seperate path outside an engine exhaust gas flow path.

13. In combination:

a high temperature exhaust manifold (172) operating in the 1800 degree F. range;

said high temperature exhaust manifold (172) having an outer wall;

a catalytic converter deriving heat from the outer wall of said high temperature exhaust manifold; and, said catalytic converter having an inlet for receiving and processing ambient pollutants in a path seperate from the exhaust flow path.

* * * * *